United States Patent Office 2,915,376
Patented Dec. 1, 1959

2,915,376

PERFLUOROALKYLIMIDAZOLINES AND COMPOSITIONS CONTAINING THE SAME

Philip J. Raifsnider, Richmond, Calif., assignor to Shell Development Company, New York, N.Y., a corporation of Delaware No Drawing. Application May 28, 1956
Serial No. 587,493

7 Claims. (Cl. 44—63)

This invention relates to a novel class of corrosion inhibitors and to compositions, particularly hydrocarbon compositions, containing minor amounts thereof as corrosion inhibitors. More particularly, it is directed to the use of the novel corrosion inhibitors for the enhancement of corrosion prevention and other properties of hydrocarbon systems and the like.

High molecular weight alkylimidazolines have been utilized for several known purposes, such as the improvement of adhesion between mineral aggregates and asphalt and for inhibiting the corrosion of casings and tubing in gas condensate wells and the like. However, the action of these materials has not been fully satisfactory due either to their thermal instability, their lack of high surface activity, or their merely partial effectiveness as corrosion inhibitors.

Hydrocarbon systems generally must be improved in one respect or another with regard to their surface active properties. For example, gasolines, especially in the presence of traces of water or water vapor, permit corrosion of motor parts, and are subject to icing difficulties at relatively low temperatures. Asphalts, although they contain small amounts of naturally occurring polar bodies, do not firmly adhere to many mineral aggregates, especially when the latter are damp at the time the asphalt is applied thereto. Lubricating oils are well known to be highly corrosive to metals with which they come in contact, especially when they contain oxidation or decomposition residues. Greases are subject to the same difficulties and the newer type of greases, namely, those gelled with a non-soap gelling agent, are subject to another shortcoming, namely, the deleterious attack of water upon the gelling agent. Oil and gas condensate wells are also subjected to intensive general or localized corrosion due either to the presence of salt water, or dissolved carbon dioxide or hydrogen sulfide, as well as to the presence of sulfide-forming bacteria. Many diverse types of additives have been employed for overcoming each of the recited difficulties, but limitations are present in each class of compositions detailed above with respect to the maximum amount which may be utilized due to side effects which may appear. For example, if too large an amount of an additive is employed in a lubricating oil for preventing corrosion therein, the oil is subject to the formation of excessive sludge deposits and gum.

It is an object of the present invention to provide a novel class of corrosion inhibitors. It is another object of the present invention to improve hydrocarbon systems with respect to their surface active characteristics. It is a particular object of the present invention to minimize the corrosion occurring in gas condensate wells, gasoline, hydrocarbon lubricating oils and grease. It is a further object of the invention to depress the ice-forming tendencies of gasoline in the presence of water vapor. Other objects will become apparent from the description of the invention.

Now, in accordance with the present invention, it has been found that 2-perfluoroalkylimidazolines and their mono-fatty acid salts are novel substances which exhibit surprisingly high surface activity, thermal stability and corrosion preventive characteristics in either aqueous or hydrocarbon systems.

The subject class of 2-perfluoroalkylamidazolines are preferably prepared by initially forming an amide of a 1,2-diaminoalkane compound and the acid chloride of at least one perfluoro fatty acid. These amides are then subjected to a cyclizing heating operation in order to eliminate water and form 2-perfluoroalkylimidazolines which have the following general structure:

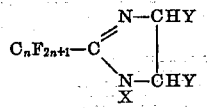

wherein $n$ is an integer from 1 to 19, X is H, a lower aminoalkyl radical (—RNH$_2$) of 2 to 3 carbon atoms or a lower hydroxyalkyl radical (—ROH) of 2 to 3 carbon atoms, and one of the Y's is H and the other one is H or an alkyl radical of 1 to 19 carbon atoms.

Ethylene diamine may be employed per se or it may be as any low molecular weight homolog or polymer thereof such as propylene diamine, diethylene triamine, triethylene tetraamine and tetraethylene pentaamine. However, the preferred species is ethylene diamine per se. Attempts to condense the ethylene diamines with perfluoro fatty acids directly resulted in the formation of perfluoro alkanes, indicating that decarboxylation occurred during the attempted condensation. Therefore, it was found necessary to convert the perfluoro fatty acids to the corresponding acid chloride before reacting with ethylene diamine. The acid chlorides are preferably formed by reaction of the perfluoro fatty acid with a molar excess of thionyl chloride for a period of 1–96 hours at temperatures between about 10 and 50° C. Excess thionyl chloride and volatile reaction products are then removed, such as by vacuum stripping, the product constituting principally the acid chloride of the original perfluoro fatty acid. This acid chloride is then added to a molar excess of ethylene diamine to form the salt (or amide), which is then heated at atmospheric pressure or at reduced pressure to remove water and excess ethylene diamine. When all of the water of condensation has been removed, such as by distillation, the reaction product so obtained is neutralized, such as by addition of an excess amount of a basic material, typically, sodium hydroxide. The product is then extracted with a water-immiscible solvent such as ether or the like and dried, preferably over calcium sulfate, to obtain the desired 2-perfluoroalkylimidazoline.

The heating period following elimination of excess thionyl chloride is for the purpose of causing cyclization of the initial reaction product by elimination of water. This may be conducted at temperatures between about 100° and 200° C., preferably in the range from about 125° to about 150° C. The cyclizing period at these temperatures will normally be between about 1 and about 3 hours.

The products so formed, due to their relatively high fluorine-to-carbon ratio, have only a limited solubility in either water or hydrocarbon systems. When solubility in water is desired, it is preferred that the mono-fatty acid salt of a lower fatty acid having from 1 to 4 carbon atoms per molecule be prepared. When solubility in hydrocarbon systems is the object, it is preferred that the perfluoroalkylimidazoline be converted to the mono-fatty acid salt wherein the fatty acid contains from about 5 to about 20 carbon atoms per molecule.

The perfluoro fatty acids to be utilized in the formation of the subject class of imidazolines include those having from 1 to 20 carbon atoms per molecule including the perfluoro derivatives of acetic, propionic, butyric, valeric, caproic, caprylic, capric, lauric, myristic, palmitic, stearic and arachidic acids. The fatty acids to be utilized in the formation of the mono-fatty acid salts of the perfluoroalkylimidazolines constitute one or more of the non-fluorinated fatty acid series.

The salts of the perfluoroalkylimidazolines are formed simply by addition of an equi-molecular amount of the fatty acid to a solution of the imidazoline. Of course, unsaturated aliphatic monocarboxylic acids may be used in place of the saturated varieties listed above. The principal unsaturated acid especially useful in the preparation of a product of diverse utility and solubility is oleic acid.

Species of the above-described reaction products include the following:

2-perfluoroalkylimidazolines:
    2-perfluoroethylimidazoline
    2-perfluorobutylimidazoline
    2-perfluoroheptylimidazoline
    2-perfluorooctylimidazoline
    2-perfluorodecylimidazoline
    2-perfluorododecylimidazoline
    2-perfluorohexadecylimidazoline
    2-perfluorooctadecylimidazoline
    2-perfluoromethyl-4-methylimidazoline
Substituted perfluoroalkylimidazolines:
    2-perfluorooctyl-3-aminoethylimidazoline
    2-perfluorohexyl-4-octadecylimidazoline
    2-perfluorododecyl-5-octylimidazoline
    2-perfluorooctyl-3-hydroxyethylimidazoline
Salts of perfluoroalkylimidazolines:
    2-perfluoroheptylimidazolinium acetate
    2-perfluorooctylimidazolinium oleate
    2-perfluorononylimidazolinium caproate
    2-perfluorododecylimidazolinium butyrate
    2-perfluoroheptylimidazolinium stearate The above-described perfluoroalkylimidazolines and their salts are useful in both aqueous media and in hydrocarbon media where corrosion inhibition is desired or required. For example, the water-dispersible species described above are especially useful in aqueous acid media for depressing corrosion normally caused by said acids of metallic containers or other metals coming in contact therewith. For example, the addition of from about 0.1 to about 1% by weight of a water-dispersible perfluoroimidazoline salt in aqueous hydrochloric or sulfuric acids results in a remarkable reduction in the rate of corrosion caused by these acids. More particularly, when the acids contain from 50 to 99% water, they may be disastrously destructive to metals in contact therewith in a short space of time. However, the addition, for example, of 0.1% by weight of 2-perfluorooctylimidazoline to a 10% aqueous HCl solution reduced the corrosion of carbon steel at room temperature after 21 hours from an infinitely high corrosion rate wherein the specimen was destroyed to a corrosion rate of only about 15 mils per year. The inhibition of corrosion caused by concentrated aqueous sulfuric acid can be effected with the same imidazoline by the addition of about 0.1% by weight to reduce the disastrously high corrosion rate of carbon steel caused thereby to a rate in the order of 40 mils per year.

It has been found that the present 2-perfluoroalkyl-imidazoline salts are highly effective for the reduction in corrosion caused by gasoline in the presence of salty water when they are utilized in amounts varying from about 0.001 to about 0.1% by weight of the gasoline or other fuel such as gas turbine fuels and the like. The latter may comprise kerosene or gas oil and, especially when utilized in aircraft, the volatile fuel in the presence of water or water vapor is subject to ice formation which in turn causes plugging of fuel line filters. The presence of the indicated quantity of perfluoroalkylimidazoline salt has been found to substantially reduce the tendency of the fuel to cause icing difficulties.

The addition of between about 0.1% and about 1% by weight of the oleophilic perfluoroalkylimidazoline salts to hydrocarbon lubricating oils and greases causes a substantial reduction in the rate of corrosion caused by the lubricating oil with respect to a wide variety of metals in contact therewith, including aluminum, steel, copper, nickel and silver. This is true not only at room temperature and below, but also at temperatures in the order of about 175° C. The lubricating oil containing the indicated quantity of imidazoline salt may, of course, be the major ingredient of a grease composition. Another allied use of the subject additives is in the formation of grease compositions wherein an inorganic grease-forming colloid such as silica, clay or other hydrophilic material is coated with approximately a monomolecular layer of the water-resistant perfluoroalkylimidazoline or its salt and thereafter dispersed in a lubricating oil to form a grease composition therewith. Normally when used for this additional function, the proportion of imidazoline compound is between about 10% and about 100%, based on the weight of the inorganic gelling agent. It is preferably added to the inorganic colloid while the latter is in an expanded condition in an aqueous medium, whereupon the imidazoline is preferentially adsorbed by the surfaces of the colloid material.

The corrosion of crude oil or gas condensate well metallic parts such as casings, tubings and the like is a problem of enormous economic concern, since the withdrawing and replacement of these parts of an operating well entail the expenditure of huge amounts of money, not only in the replacement materials involved, but also in the loss of production during a replacement period. The presence of acidic gases such as $SO_2$, $H_2S$ and $CO_2$ in the water produced together with the gas or petroleum crude oil normally aggravates the corrosion problems involved. However, it has been found that the addition of between about 0.005 and 0.1% by weight, based on the aqueous phase, of the perfluoroalkylimidazoline or its salt causes a marked reduction in the rate of corrosion caused by the system in the absence of oxygen comprising a hydrocarbon fluid, salty water and $H_2S$ or $CO_2$. The perfluoroalkylimidazoline compound may be injected continuously or intermittently into the well, preferably in the annular space between the casing and tubing, but may be injected through the tubing at the bottom of the well if preferred or practical.

The following examples illustrate the preparation of the subject 2-perfluoroalkylimidazolines and their use in the protection of representative aqueous and hydrocarbon systems:

Example I 200 parts by weight of perfluorocaprylic acid was stirred with a molar excess of thionyl chloride at room temperature for about 48 hours. Excess thionyl chloride was stripped from the product, which comprised the acid chloride of perfluorocaprylic acid. This product was added to a molar excess (50 parts by weight) of ethylene diamine at room temperature to form the corresponding amide. The amide was heated at atmospheric pressure for conversion to the imidazoline by elimination of water and cyclizing of the product. Heating also removed excess ethylene diamine. Water was continuously distilled until a temperature of 132° C. was reached (2 hours). The cyclized product was neutralized with 300 parts by weight of 10% aqueous sodium hydroxide, ether extracted and dried over calcium chloride to obtain the product, which was 2-perfluoroheptylimidazoline which contained 64% by weight of fluorine and 5.7% by weight of nitrogen.

The product had only a moderate solubility in gasoline and, in order to convert this to a gasoline-soluble material, it was reacted with oleic acid in an equimolar amount to form the monooleate of the imidazoline.

*Example II*

A straight run gasoline (80 cc.) was contaminated with 1 cc. of 0.05% aqueous sodium chloride. The contaminated gasoline was left at room temperature in the presence of air in contact with a carbon steel strip, being rotated at 60 r.p.m. for about 18 hours. At the end of this period, it was found that the test strip was badly corroded. In a parallel test, but in which 0.003% by weight of the imidazoline oleate compound produced as described in Example I was also added to the gasoline, only a minor amount of corrosion of the strip occurred.

*Example III*

A more severe gasoline corrosion test is conducted by submerging a carbon steel plate 2½ inches square in the gasoline, after which a single drop of salt water is placed on the plate. In the absence of any inhibitor, severe rusting of the plate occurred in 15 minutes. The presence of 0.01% by weight of the imidazoline oleate formed according to Example I prevented any corrosion up to a period of about 6 hours. The presence of 0.001% by weight of the imidazoline oleate prevented corrosion for 3 hours.

*Example IV*

Carbon steel was immersed in a 10% aqueous hydrochloric acid solution. The steel strip commenced to disintegrate rapidly at room temperature. The addition of 0.1% by weight, based on the hydrochloric acid solution, of the imidazoline prepared according to Example I reduced the corrosion rate at room temperature to approximately 15 mils per year.

*Example V*

Concentrated aqueous sulfuric acid disintegrates carbon steel at a high rate of corrosion at room temperature. However, the addition of 0.1% by weight of the imidazoline prepared according to Example I reduced the corrosion rate to about 42 mils per year.

*Example VI*

In order to simulate the conditions present in gas condensate wells, tests were carried out in 4-ounce oil sample bottles, containing a ⅜ x 5⅝" sandblasted specimen of cold rolled carbon steel. The bottles contained 50 cc. kerosene, 10 cc. distilled water which contained 3% sodium chloride, 0.1% calcium chloride, 0.03% magnesium chloride, and 0.1% acetic acid. The bottles were rotated end-over-end at 60 r.p.m. for 24 hours at 180° F. The specimens were then cleaned by immersing with gentle action for 1 minute in concentrated hydrochloric acid containing 5% $SnCl_2$ and 2% $Sb_2O_3$. The specimen was then neutralized immediately in sodium bicarbonate solution, rinsed with water and dried. Controlled cleaning loss was 3 milligrams and the corrosion rate was calculated from net weight loss. In the absence of any inhibitor in the system, the specimen of steel corroded at a rate of about 53 mils per year. The presence of 0.01% of the imidazoline oleate prepared according to Example I above reduced the corrosion rate under the same conditions to less than 10 mils per year.

I claim as my invention:

1. A composition consisting essentially of a petroleum hydrocarbon having dispersed therethrough a minor effective corrosion-inhibiting amount of a perfluoroalkylimidazoline compound of the group consisting of perfluoroalkylimidazolines having the general formula

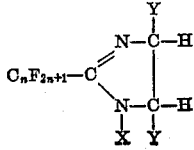

wherein $n$ is an integer from 1 to 19, X is a radical of the group consisting of hydrogen, $-C_2H_4NH_2$, $-C_3H_6NH_2$, $-C_2H_4OH$ and $C_3H_6OH$, one of the Y's is a hydrogen radical and the other is a radical of the group consisting of hydrogen and $C_{1-19}$ alkyl, and fatty acid salts of said perfluoroalkylimidazolines.

2. A composition consisting essentially of a hydrocarbon oil boiling in the range from gasoline to lubricating oil having dispersed therethrough a minor effective corrosion-inhibiting amount of a perfluoroalkylimidazoline compound of the group consisting of perfluoroalkylimidazolines having the general formula

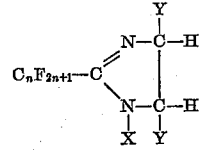

wherein $n$ is an integer from 1 to 19, X is a radical of the group consisting of hydrogen, $-C_2H_4NH_2$, $-C_3H_6NH_2$, $-C_2H_4OH$ and $C_3H_6OH$, one of the Y's is a hydrogen radical and the other is a radical of the group consisting of hydrogen and $C_{1-19}$ alkyl, and fatty acid salts of said perfluoroalkylimidazolines.

3. A composition consisting essentially of a gasoline having dispersed therethrough a minor amount, sufficient to substantially improve the corrosion characteristics thereof, of a perfluoroalkylimidazoline compound of the group consisting of perfluoroalkylimidazolines having the general formula

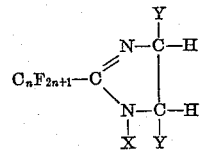

wherein $n$ is an integer from 1 to 19, X is a radical of the group consisting of hydrogen, $-C_2H_4NH_2$, $-C_3H_6NH_2$, $-C_2H_4OH$ and $C_3H_6OH$, one of the Y's is a hydrogen radical and the other is a radical of the group consisting of hydrogen and $C_{1-19}$ alkyl, and fatty acid salts of said perfluoroalkylimidazolines.

4. A composition consisting essentially of a hydrocarbon gas-condensate mixture contaminated with an aqueous phase containing dissolved acidic gases, said composition having dispersed therethrough a corrosion-inhibiting minor proportion of a perfluoroalkylimidazoline compound of the group consisting of perfluoroalkylimidazolines having the general formula

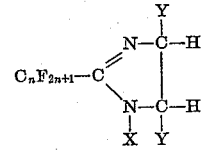

wherein $n$ is an integer from 1 to 19, X is a radical of the group consisting of hydrogen, $-C_2H_4NH_2$, $-C_3H_6NH_2$, $-C_2H_4OH$ and $C_3H_6OH$, one of the Y's is a hydrogen radical and the other is a radical of the group consisting of hydrogen and $C_{1-19}$ alkyl, and fatty acid salts of said perfluoroalkylimidazolines.

5. A composition consisting essentially of a gas turbine hydrocarbon fuel and a minor amount, sufficient to depress ice formation therein in the presence of water, of a perfluoroalkylimidazoline compound of the group consisting of perfluoroalkylimidazolines having the general formula

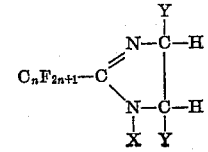

wherein $n$ is an integer from 1 to 19, X is a radical of the group consisting of hydrogen, $-C_2H_4NH_2$, $-C_3H_6NH_2$, $-C_2H_4OH$ and $C_3H_6OH$, one of the Y's is a hydrogen radical and the other is a radical of the group consisting of hydrogen and $C_{1-19}$ alkyl, and fatty acid salts of said perfluoroalkylimidazolines.

6. A composition according to claim 1 wherein the perfluoroalkylimidazoline compound is $C_{5-20}$ fatty acid salt of an unsubstituted perfluoroalkylimidazoline.

7. A composition according to claim 6 wherein the salt is the oleic acid salt of 2-perfluoroheptylimidazoline.

References Cited in the file of this patent

UNITED STATES PATENTS

| | | |
|---|---|---|
| 2,215,861 | Waldman et al. | Sept. 24, 1940 |
| 2,252,723 | Miescher et al. | Aug. 19, 1941 |
| 2,418,077 | Kyrides et al. | Mar. 25, 1947 |
| 2,468,163 | Blair et al. | Apr. 26, 1949 |
| 2,568,876 | White et al. | Sept. 25, 1951 |
| 2,622,018 | White et al. | Dec. 16, 1952 |
| 2,668,100 | Luvisi | Feb. 2, 1954 |